Nov. 3, 1953 H. Z. GORA 2,657,426
CLOSURE MAKING MACHINE
Filed April 22, 1949 6 Sheets-Sheet 1

Inventor
Henry Z. Gora
By
Johnson and Kline
Attorneys

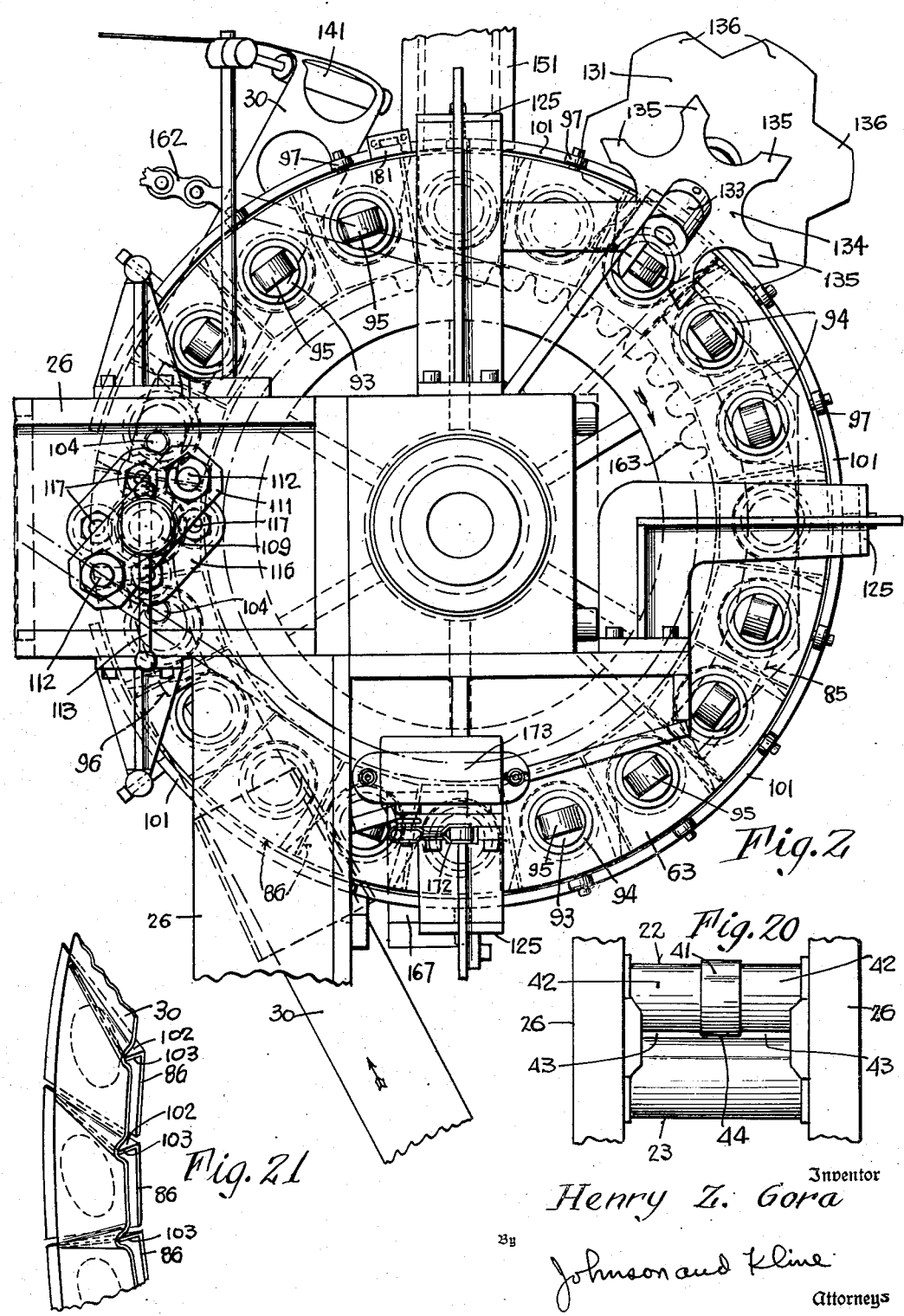

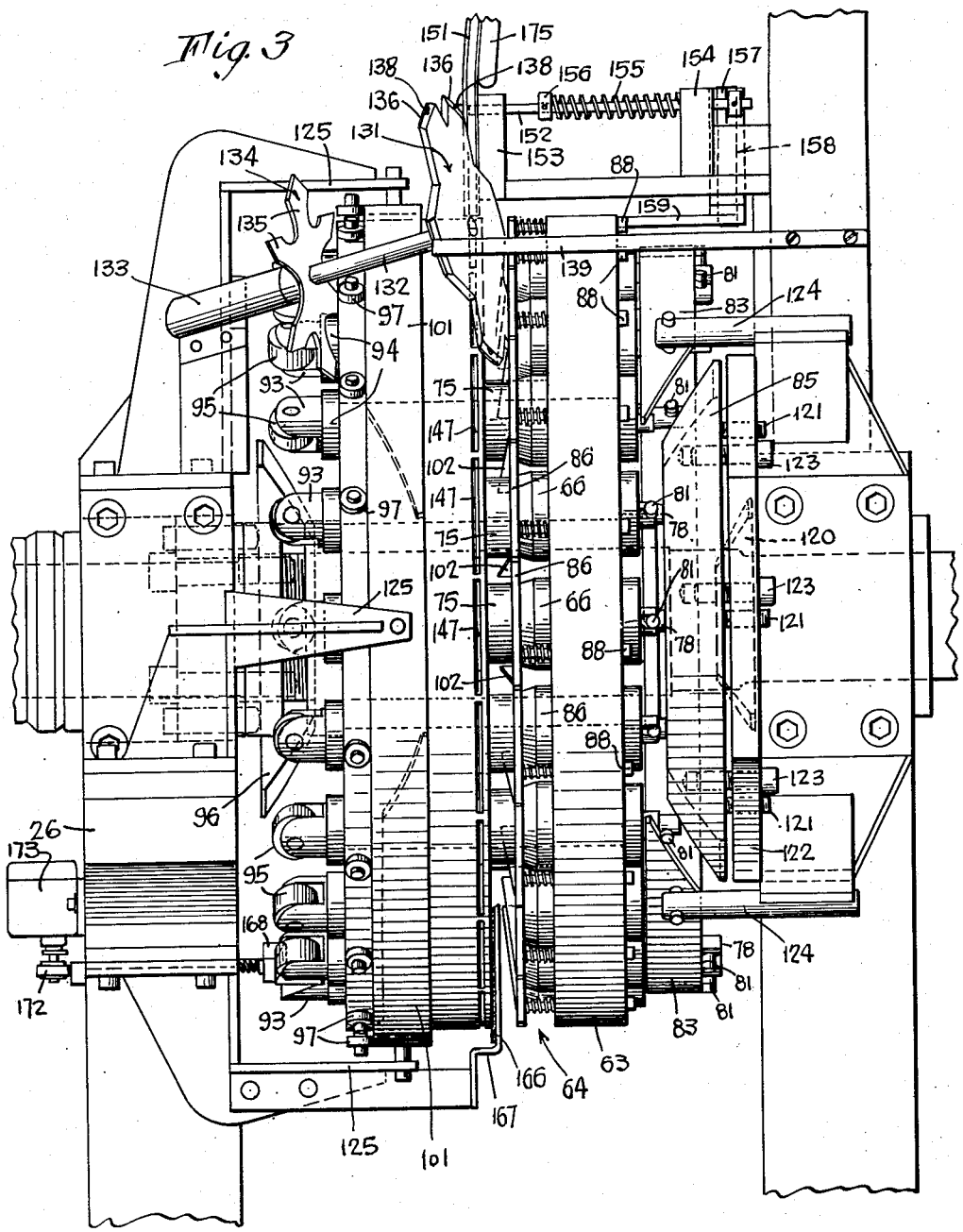

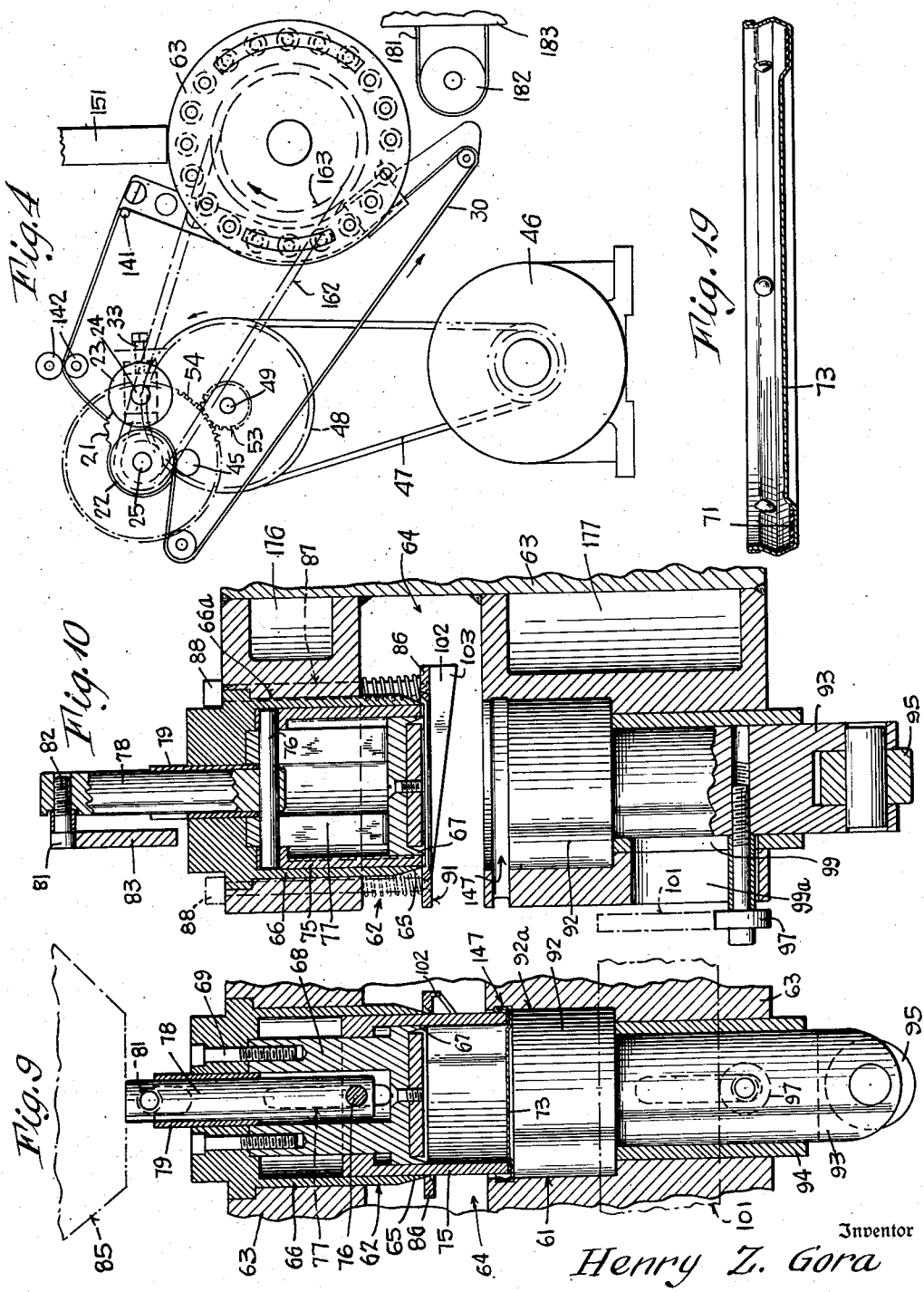
Nov. 3, 1953   H. Z. GORA   2,657,426
CLOSURE MAKING MACHINE
Filed April 22, 1949   6 Sheets-Sheet 4
Inventor
Henry Z. Gora
By
Johnson and Kline
Attorneys

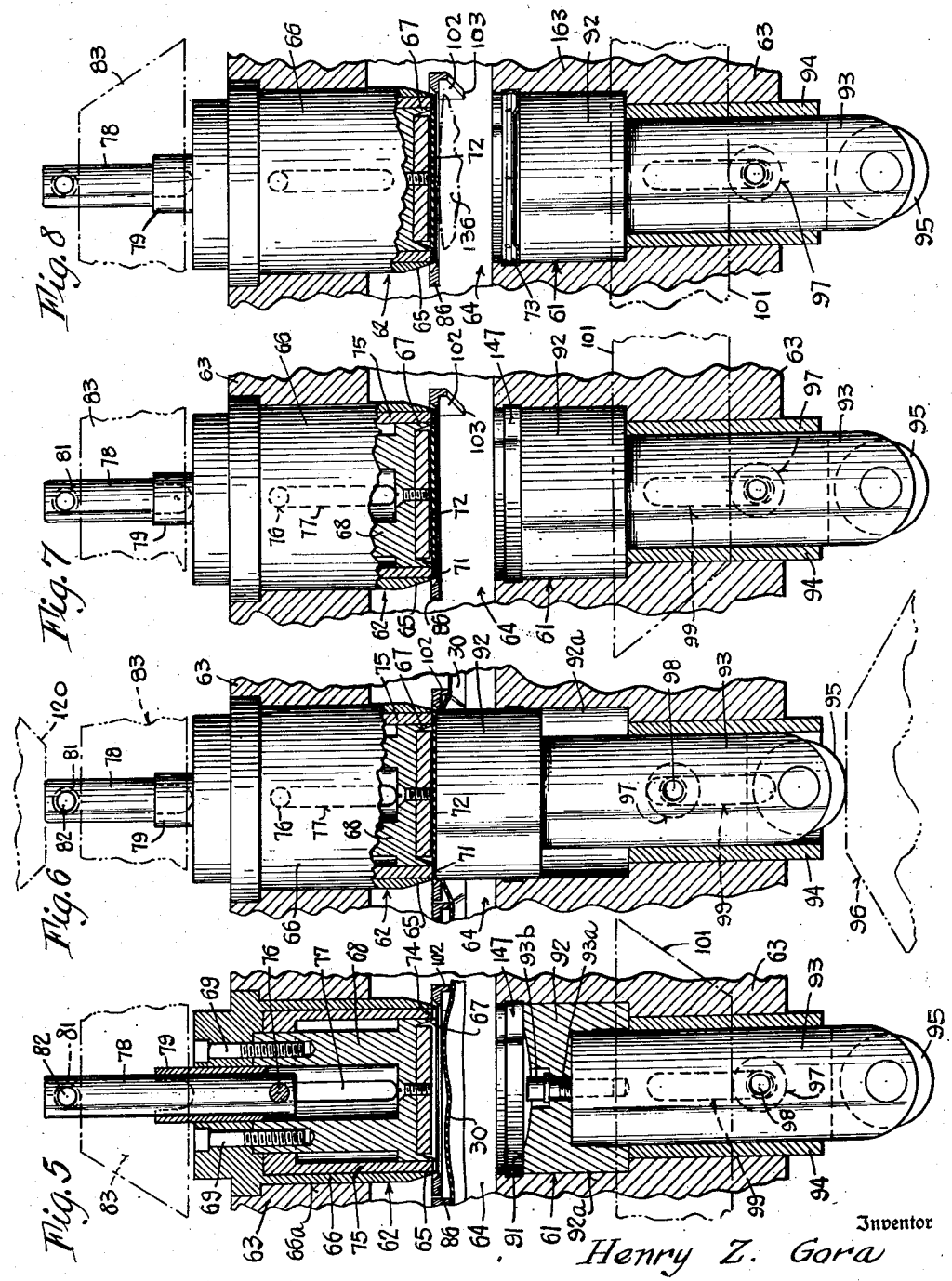

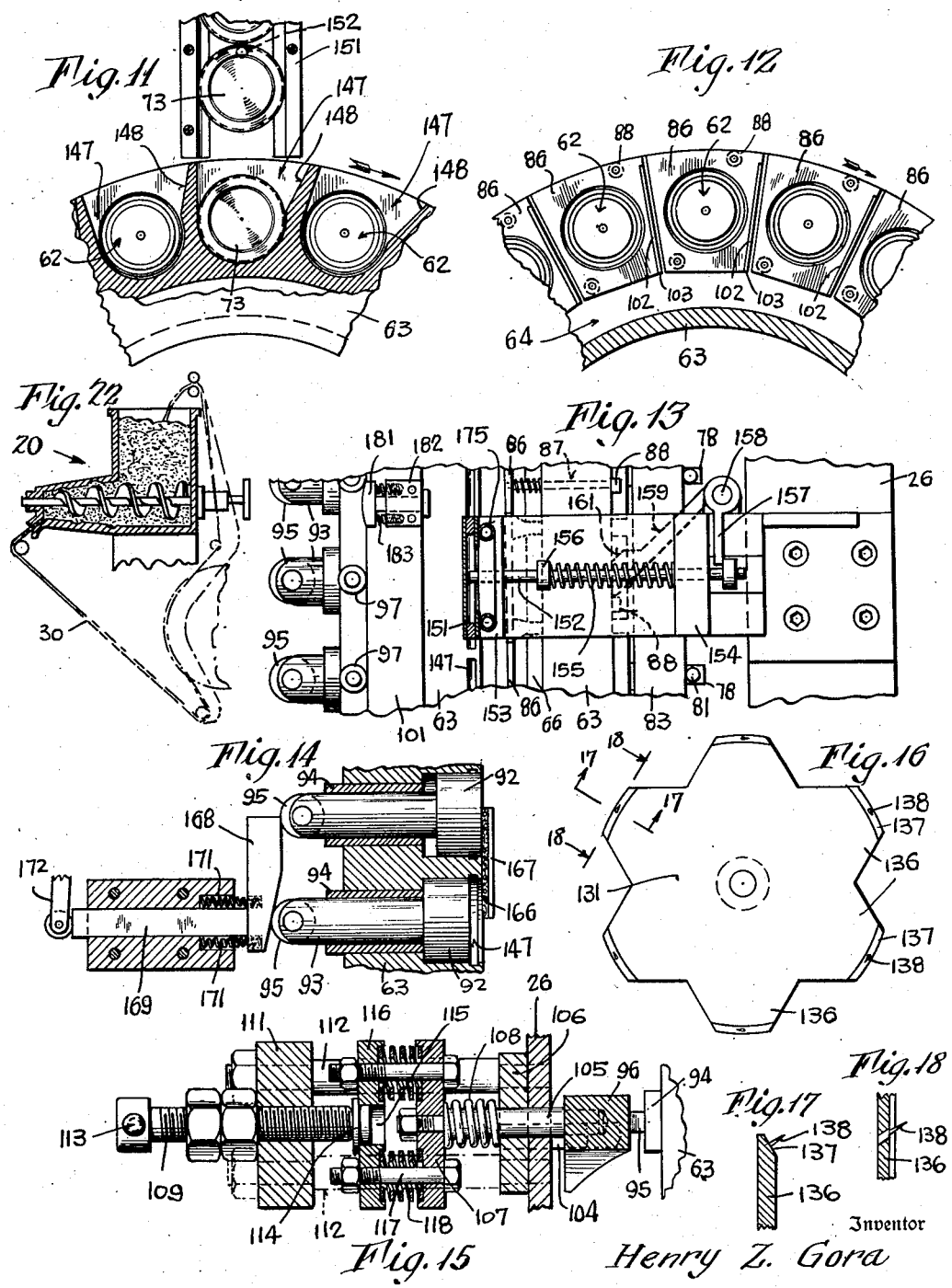

Patented Nov. 3, 1953

2,657,426

UNITED STATES PATENT OFFICE 2,657,426

CLOSURE MAKING MACHINE

Henry Z. Gora, Stratford, Conn., assignor, by mesne assignments, to Anchor Hocking Glass Corporation, Lancaster, Ohio, a corporation of Delaware Application April 22, 1949, Serial No. 89,088

16 Claims. (Cl. 18—5)

This invention relates to the manufacture of composite articles, and in particular to the manufacture of container closures having gaskets for engaging and sealing the containers to which the closures are applied.

In sealing containers such as wide mouth jars, for example, it is usual to employ a closure member suitably shaped from sheet metal or other material having an annular gasket frequently formed of some moldable and sometimes a curable material such as a rubber compound or a similar material, adherently applied in position to engage and seal the edge of the jar adjacent its mouth.

An object of this invention is to provide an improved automatic machine of high productive capacity for continuously producing annular gaskets and adhering them to closure members in a continuous operation.

A further object is to provide an improved method of continuously producing closure members having annular gaskets secured therein.

A feature of the invention is the provision of an automatic machine for continuously forming annular gaskets from a continuous strip of plastic gasket material and then depositing the gaskets in and adhering them to a succession of closure members in a continuous operation.

A further feature of the invention is the provision of automatic mechanism wherein a continuously moving strip of gasket material is guided between gasket forming dies which cut successive gasket rings from the strip during movement thereof past a first operating station and deposit such rings in successive die members for transfer thereby to a second operating station where they are deposited in successive closure members under operating conditions which cause them to adhere to the closures.

A further feature of the invention is the provision of a machine constructed and arranged to have high productive capacity without, however, requiring a correspondingly high speed in the cutting movement of the dies when cutting gaskets from the strip of gasket material. This permits operating the dies at the most efficient cutting speed without limiting the speed of operation of the machine or its output.

A further feature is the provision of a plasticizing mill for gasket material having mill rollers which are spaced apart sufficiently to produce the relatively large quantity of plasticized material required for continuous quantity production, while at the same time providing a relatively thin, continuous strip of gasket material, the thickness of which substantially corresponds with that of the relatively thin finished gaskets.

These and other objects and advantages are attained by the present invention, one embodiment of which is hereinafter described, and illustrated in the accompanying drawings in which:

Fig. 2 is a view in elevation of a rotary die carrier constituting another part of the machine and illustrative of further features of the invention.

Fig. 3 is an elevation of the mechanism shown in Fig. 2 looking from the right of Fig. 2.

Fig. 4 is a schematic diagram of a machine assembly illustrative of one embodiment of the invention and of a preferred method of operation.

Figs. 5 to 9 are sectional detail views through one of the pairs of cooperating relatively movable die members carried by the rotary die carrier shown in Figs. 2 and 3, illustrating the sequence of operations in forming an annular gasket and applying it to a closure member.

Fig. 10 is a sectional view taken at right angles to the views of Figs. 5 to 9.

Fig. 11 is a sectional view of a machine detail illustrating one form of mechanism for feeding closure members to the rotary die carrier.

Fig. 12 is an elevation of a row of gasket cutting dies as illustrated in Figs. 5 to 10.

Fig. 13 is a plan view of one form of an escapement mechanism for controlling the gravity feed of closure members to the rotary die carrier.

Figs. 14 and 15 are sectional views of certain mechanical details.

Fig. 16 is a view in elevation of an ejector device for ejecting the waste centers from the annular gasket rings after the latter are cut.

Figure 1:
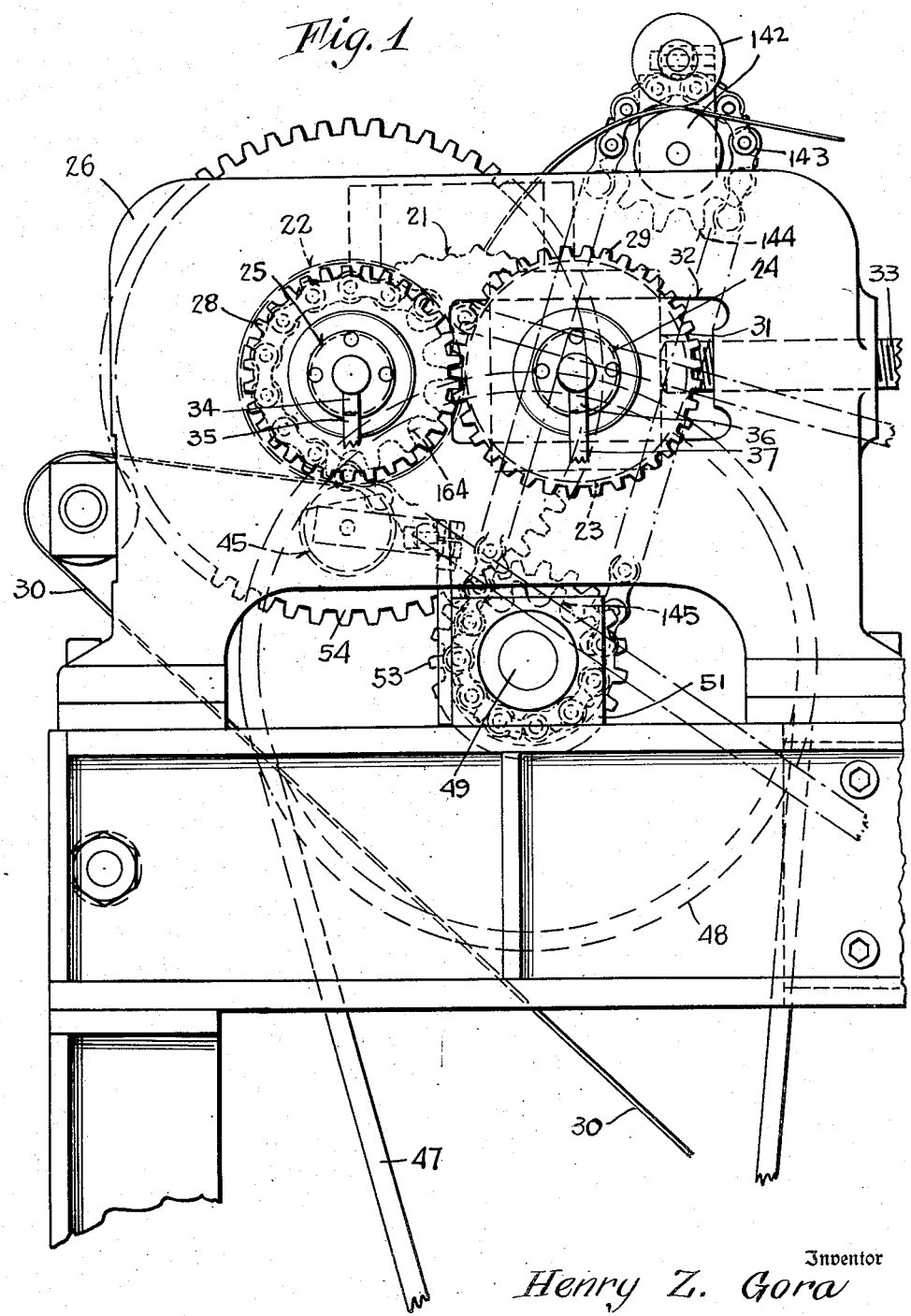
Figure 1 is a view in elevation of a plasticizing mill illustrative of certain features of the invention and forming a part of the present machine.

Figs. 17 and 18 are sectional views on the lines 17—17 and 18—18 respectively, of Fig. 16.

Fig. 19 is a sectional view through a finished closure member with the annular gasket adherently applied thereto in accordance with the present invention.

Fig. 20 is a plan view of the mill rollers shown in Fig. 1.

Fig. 21 illustrates one form of mechanism for taking up the slack in the radially inner area of the strip of gasket material as it is curved edgewise during movement with the cutting dies.

Fig. 22 is a section showing an alternative type of mechanism for supplying the gasket forming material.

In accordance with this invention, a batch 21 of gasket material is subjected to the operation of a plasticizing or warming device to produce gasket material having the desired plastic and moldable qualities for the production of closure-lining gaskets and their application to closure members. Such a device may be of any desired type such, for example, as screw operated extruding machine 20, as shown in Fig. 22, or a roller mill as shown in Fig. 1. The device illustrated in Fig. 1, for example, comprises a pair of rollers 22 and 23 mounted on shafts 24 and 25, respectively, rotatably supported in the machine frame 26. The supporting shafts are connected by gears 28 and 29 of different pitch diameter for the purpose of operating the rollers at different speeds to produce the desired milling effect. One of the roller supporting shafts, such as the shaft 24, is supported in bearing blocks 31 slidably mounted in slots 32, see Fig. 1, in the machine frame to permit adjustment of the spacing between the mill rollers. Bearing adjusting screws 33 are threaded in the machine frame and engage the bearing blocks 31 for limiting the spacing of the rollers which are pressed apart in operation by the material passing between them. The temperature of the mill rollers, can, if desired, be controlled by passing through pipes 34, 35, 36 and 37, suitable cooling or heating fluid to the rollers and supporting shafts 24, 25 which may be hollow for this purpose.

As illustrated, a strip 30 of plasticized material is peeled from a mill roller as hereafter described. It is relatively thin, having substantially the same thickness as the finished gasket when applied to a closure member. As illustrated in Fig. 20, one of the mill rollers 22 has its surface relieved at each side of a central portion 41 which constitutes a land between roller areas 42 of reduced diameter. The relieved surface areas 42 provided slots 43 between the rollers 22 and 23 of sufficient size to plasticize material from the batch 21 in the desired volume, while the land 41 forms a slot 44 with the roller 23 sufficiently thin and of such width as to provide a strip 30 having the desired dimension. A pair of rotary cutters 45 are positioned in contact with the central portion 41 of the roller 22.

The mill can be driven by any suitable driving means such as a variable speed electric motor 46 connected by a driving belt 47 to a pulley 48 secured to a shaft 49 rotatably mounted in bearing blocks 51 supported on the machine frame 26. A gear 53 on the shaft 49 meshes with and drives a large gear 54 on the roller shaft 25.

The strip 30, formed by this or any other mechanism, is subjected to the operation of die members which cut gaskets from the strip and apply the cut gaskets to closure members. For this purpose, the illustrated machine comprises a plurality of pairs of cooperating die members 61, 62, mounted for relative movement along rectilinear lines on a rotary die carrier 63 which is shown as having a peripheral slot 64, the cooperating dies 61, 62, of each pair being mounted on opposite sides of the slot. In the illustrated embodiment, each die member 62 has an outer circular cutting edge 65 formed on the end of a cutter cylinder 66 secured in an opening 66a formed in the die carrier at one side of the slot 64. An inner circular cutting edge 67, see Fig. 5, which is concentric with the outer cutting edge 65 and spaced radially inward therefrom a distance corresponding to the width of the annular gasket, is formed on the end of an inner cutter cylinder 68 bolted to the bottom of the outer cutter cylinder 66 by suitable clamping bolts 69. In this way the cutting edges 65 and 67 are rigidly secured together in radially spaced, concentric relationship, so that when the strip 30 of gasket material is pressed against them, an annular gasket 71 will be cut therefrom and retained between the concentric cutting edges. At the same time, an inner central disk 72 of waste material is cut from the center of the annular gasket 71, as shown, for example, in Figs. 6, 7 and 8. This waste disk is ejected by mechanism hereafter described.

Each die member 62 includes mechanism for transferring the cut gasket 71 from its position between the circular cutting edges 65, 67 and depositing it in a closure member 73. As illustrated, this mechanism includes a circular transfer surface 74 which is formed on the end of a transfer cylinder 75 mounted for sliding movement between and past the cutting edges through the annular space between them. The transfer cylinder 75 slidably engages the inner surface of the outer cutter cylinder 66 and the outer surface of the inner cutter cylinder 68. The inner end of the transfer cylinder is connected by a pin 76 extending through slot 77 in the wall of the inner cutter cylinder 68 to an operating plunger 78. The plunger 78 is slidably supported in a bushing 79 extending through the bottom of the outer cutter cylinder 66. The plunger 78 has a cam follower 81 mounted on a stud 82 threaded in the side of each plunger. The cam follower 81 engages an arcuate plunger retracting cam 83 for retracting the transfer cylinder 75 and holding it in retracted position for a determinate part of the circuit through which the die member 62 is moved by rotation of the carrier 63. As shown in Fig. 3, an arcuate transfer operating cam 85 is mounted between the ends of the retracting cam 83 to engage the end of the plunger 78 so as to move it to and project the transfer cylinder 75 outwardly past the cutters for the purpose of transferring the cut gasket 71 from its position between the cutters to position it in a closure member, as more fully described hereafter.

As shown in Figs. 10 and 21, each die member 62 includes a yieldable ring 86 slidably mounted on the ends of through bolts 87, the heads 88 of which bear against the outer side of the die carrier 63. A helical spring 89 surrounds each through bolt between the plate 86 and the adjacent face of the die carrier so as to normally press the plate outwardly into position where its outer face 91 is positioned beyond the plane of the cutting edges. The yielding plate 86 provides a holding surface as later described for the strip of gasket material when the latter is pressed against the gasket cutting knives.

Each cooperating die member 61 is movable relative to the associated die member 62 for the purpose of pressing gasket material placed between them into contact with the gasket cutting knives 65, 67, to cut the gasket 71 therefrom. As illustrated, each cooperating die member 61 comprises a circular die face 91 formed on the end of a presser die member 92 slidably mounted in an opening 92a formed in the die carrier 63 on the side of the slot 64 opposite to the die member 62. Each die member 92 includes a plunger 93 slidably mounted in a bushing 94 and projecting outwardly on the opposite side of the die carrier. The end of each plunger 93 has a cam follower, such as a roller 95, adapted to engage an arcuate plunger-projecting cam 96 for projecting the die member 92 outwardly to press the intervening strip 30 of gasket material against the gasket forming cutters 65, 67 as illustrated in Fig. 6. As shown in Fig. 5, the die face 91 is slightly concave for the purpose of lessening its area of contact with the gasket material to avoid any tendency of gasket material adhering thereto. For the same purpose, each plunger 93 is secured to the associated die member 92 by a threaded bolt 93a having a head 93b projecting slightly beyond the concave die face 91 to assist in keeping the gasket material out of contact with the die face. Each plunger 93 is provided with a second cam follower illustrated as a roller 97 mounted on a pin 98 projecting radially outward from the plunger 93 through slots 99 and 99a formed in the bushing 94 and the wall of the die carrier 63, respectively. The cam follower 97 is adapted to engage an arcuate plunger-retracting cam 101 for retracting and holding the plunger 93 and die face 91 in retracted, inoperative position during a predetermined part of the movement with the carrier 63.

The continuous strip 30 of gasket material is guided edgewise into the die carrier slot 64 between the pairs of cooperating dies for movement therewith through a part of the circuit through which the dies move. In manufacturing ring-shaped gaskets for wide mouth jars, the diameter of the gaskets requires a relatively wide strip 30. Obviously, the necessity of curving the strip edgewise about a line outside the strip and at right angles to the plane of the strip for movement along the curved circuit of the die members in the plane of the strip will have a wrinkling effect upon the inner edge of the strip which tends to assume a smaller radius of curvature than the outer edge of the strip, unless some means is provided for overcoming this tendency. As illustrated, such wrinkling of the strip as would interfere with proper formation of gasket rings is prevented by tapered guide plates 102, one of which is positioned edgewise between successive cutting die members 62, with the higher end 103 of the taper positioned radially inward of the die carrier. When the presser dies 92 are projected outwardly to press the strip 30 against the associated cutting dies 65, 67, the tapered plates 102 produce an undulating shape to the inner portion of the curved strip 30 sufficient to compensate for the shortened radius thereof and take up the slack, with the result that the portion of the strip pressed against the gasket cutters is substantially flat and the resulting gasket 71 has the desired, proper, ring shape.

It will be apparent that movement of the presser die member 92 must be accurately controlled in pressing the thin strip 30 against the cutting edges 65, 67, and that the die member 92 must be projected just far enough to cause the cutting edges to cut the gasket without damaging either the cutting edges or the face of the die member 91. For this purpose mechanism is provided for accurately adjusting the position of the die projecting cam 96. As illustrated, see Fig. 15, the cam is mounted for sliding movement on guide pins 104, see Fig. 2, toward and from the die plunger 93 for adjusting the point to which the die 92 is projected. The cam 96 is secured to a pin 105 extending through the frame 26 and a supporting frame member 106 and having its outer end rigidly connected to a plate 107, a helical spring 108 surrounding the pin between the machine frame and the plate 107 so as to normally press the pin and cam 96 outwardly, or to the left as shown in Fig. 15. The presser plate 107 is yieldingly pressed inwardly, or to the right in Fig. 15, by a bolt 109 threaded through a backing plate 111 mounted on the ends of long bolts 112 extending outwardly from the machine frame on opposite sides of the plate 107. The outer end of the threaded bolt has a crank arm 113 and its inner end engages a wear member 114 seated in an opening 115 in the center of a second presser plate 116 which is connected to the plate 107 by bolts 117 threaded to the plate 116 and extending slidably through the plate 107. A helical spring 118 surrounds each bolt 117 between the presser plates 107, 116 for yieldingly pressing the plates apart. It will be apparent that rotation of the adjusting bolt 109 by the crank arm 113 to move the same inwardly will compress the helical springs 118 and yieldingly press the plate 107 inwardly against the pressure of the spring 108 to adjust the cam 96 inwardly and shift the limit of projection of the die 92 toward the cutter 65, 67. On the other hand, rotation of the bolt 109 in the opposite direction will relieve the pressure on the plate 107 permitting the spring 108 to retract the cam 96 with the result that die 92 is projected a lesser distance toward the cutters 65, 67. When the die 92 is projected into gasket cutting position as shown in Fig. 6, the end of the transfer plunger 78 engages the face of a backing cam 120 for accurately locating the gasket engaging face 74 of the cylindrical transfer member 75. This face is so positioned relative to the cutting edges 65, 67, that the gasket 71 is pressed against the transfer face 74 in the cutting operation, and the cam 120 resists all tendency to displace the transfer face and cylinder during the cutting operation.

The transfer operating cam is accurately positioned for operating the plunger 78 by threaded studs 121, see Fig. 3, which are threaded in the frame member 122. Cap bolts 123 are employed to draw the cam member 85 tightly against the ends of the studs 121. The transfer cylinder retracting cam 83 is illustrated as mounted on supporting pins 124, see Fig. 3, secured to machine frame, while the retracting cam 101 for the die 92 is supported on spaced bracket arms 125.

It will be apparent that the operation of cutting the annular ring-shaped gasket 71 from the strip 30 also cuts a central waste disk 72 from the material within the ring-shaped gasket. This disk adheres to the inner face of the inner cutter 67, see Figs. 6, 7, 8, and must be disposed of. The illustrated mechanism for ejecting this waste disk comprises a rotary ejector 131 mounted on a rotary shaft 132 supported in a bearing 133 mounted on a machine frame. The shaft 132 is driven by any suitable means such as a star wheel 134 having spaced radial arms 135 adapted to be engaged by the successive projecting ends of the bushings 94 through which the die plungers 93 extend. As the die carrier 63 rotates the bushings successively engage and operate the star wheel. The ejector wheel has a plurality of radial arms 136 having end faces 137, see Figs. 16 and 17, from which project pointed, disk-engaging ejector pins 138 which are caused by rotation of the wheel to penetrate successive waste disks 72 and eject them from the machine, the disks being wiped off the pins 138 by a wiper blade 139.

After cooperating dies have moved through the gasket cutting station they rotate away from the perforated strip 30 which is then returned to the plasticizing mill over an idler roller 141 and between a pair of power driven strip return rollers 142. The latter are driven by a chain 143 connecting a gear 144 on the shaft of one of the rollers 142 with a gear 145 mounted on the pulley shaft 49.

After cutting the gasket ring 71, individual closure members 73 are successively fed into position on the die carrier between each pair of cooperating dies. As illustrated, a closure holding pocket 147, see Fig. 11, is provided in the die carrier adjacent the outer end of each die bore 92a, see Fig. 9. The leading wall 148 of each pocket, relative to the direction of rotation of the die carrier 63, is inclined forwardly as shown in Fig. 11 to provide a wide entrance mouth to the pocket and give a closure member sufficient time to drop into the pocket as it moves past the lower end of a feed chute 151. The latter is supplied with the closure members from any suitable source, not shown, and extends vertically downward to a point just above the top of the die carrier, so that the closure members 73 can be fed by gravity into the successive pockets as the die carrier rotates.

In the present machine, an escapement mechanism for controlling the gravity feed of the closures to successive pockets one at a time is provided. As illustrated, it comprises a rod 152 slidably mounted in spaced brackets 153, 154 and normally spring pressed into closure-holding position by a helical spring 155 surrounding the rod and compressed between the bracket 154 and a collar 156 secured to the rod 152. The rod is periodically retracted against the pressure of the spring 155 to release the bottom closure in the chute by a finger 157 secured to the upper end of a vertical shaft 158 having a crank arm 159 secured to the opposite, lower, end thereof. The outer end of the crank arm 159 is formed with a cam surface 161 for successive engagement by the heads 88 on the outer circle of the through bolts 87 which support the yielding plates 86, as hereinabove described. As each bolt head moves past the cam-shaped end of the crank arm 159, the escapement rod 152 is withdrawn from engagement with the bottom closure member 146 long enough to permit the latter to drop into the subjacent pocket 147 in the die carrier as the latter moves past the lower end of the chute 151. The escapement spring 155 immediately snaps the escapement rod 152 back into the chute to stop the descent of the following closure member until the crank arm 159 is again actuated by the following bolt head 88. Obviously, the operation of the escapement is thus automatically timed and coordinated with the movement of the pockets 147 past the chute 151.

The die carrier is rotated, and its speed of rotation coordinated with the speed of rotation of mill rollers 22, 23, and hence with the speed of travel of the strip 30, by a driving chain 162 connecting a gear 163 on the die carrier supporting shaft with a gear 164 on the mill roller shaft 25.

After the gaskets are transferred to the closure members and adhered thereto, the composite members drop out of the pockets 147 by gravity from the bottom of the die carrier as it rotates.

Mechanism is provided for both applying a mold lubricant to the faces of the dies 92, and this mechanism is so arranged as to automatically check each pocket 147 to make certain that no closure member remains therein, inasmuch as failure of a closure member to drop out of a pocket would stall the next operation of the die members in cutting the next ring-shaped gasket 71. As illustrated, this mechanism comprises a lubricant conveying wick 166, see Figs. 3 and 14, supported on a bracket 167 and supplied with lubricant from any desired source, not shown. A safety cam finger 168 on a pin 169 is slidably mounted in the machine frame and yieldingly held by coil springs 171 in position to engage the cam follower rollers 95 on the ends of the successive die plungers 93. The cam finger 168 is so positioned that, as the successive die plungers 93 engage the fingers seriatim, each die member 92 is moved outwardly just sufficient to cause the die face 91 to wipe past the lubricant supplying wick 166, as shown in Fig. 14. In this operation, the dies 92 move across the closure retaining pockets 147. Hence, should a closure member fail to be ejected and consequently remain in any pocket for any reason, its presence in the pocket will prevent outward movement of the die 92 and die plunger 93 by the cam finger 168. Under such conditions, movement of the blocked plunger 93 past the cam finger 168 forces both the finger and the supporting rod 169 to be shifted outwardly, to the left in Fig. 14, to operate a micro switch arm 172. This, in turn, operates a micro safety switch 173 in the circuit of the driving motor 46, see Fig. 2, and shuts off operation of the machine.

An additional safety feature is provided by a cam member 181 movably mounted in a bracket 182 on the retracting cam 101 and located at the top of the die carrier to engage the rollers 97 on the plunger pins 98 to insure retraction of the die members 92 to their full extent so as to clear the closure receiving pocket 147 for reception of the closures 73. The cam 181 is yieldingly held in operative position by springs 183.

In operation, it will be apparent that the continuous strip 30 of gasket material is moved continuously through a closed path which includes the plasticizing mill, and that the series of cooperating, relatively removable dies 61, 62, are themselves moved through a closed circuit. The path of the gasket material and the circuit of the die members coincide for a predetermined distance. For movement through the coincident path and circuit, the strip 30 of gasket material is guided edgewise into the die carrier slot 64 between the cooperating dies 61, 62, of each pair, as shown in Fig. 5, for example. Thereupon, as shown in Figs. 6 to 10, the plungers 93 of successive dies 92 are moved, seriatim by engagement with the cam 99 to press the strip of material against the gasket cutters 65, 67, to cut ring-shaped gaskets 71 and press them in succession against the transfer faces 74 sufficiently to cause them to temporarily adhere thereto. At the same time each inner waste disk 72 is frictionally retained by the inner surface of the inner cutter 67 and temporarily held therein.

During cutting, the radially inner portion of the strip 30 is given an undulating shape by the tapered plates 102 as best shown in Fig. 21, in order to compensate for the shorter length of the inner, curved portion of the strip. By this means the sections of the strip 30 between the tapered plates 102 can be pressed by the plunger dies 93 against the gasket cutting knives in substantially flat condition to accurately form gaskets having the desired ring shape. Thereupon, rotation of the carrier 63 causes the retracting cam 101 to successively engage the rollers 97 on the plungers 93 and retract the dies 92 back into the bores 92a. At this point the coincident travel of the strip 30 and the cooperating dies 61, 62 is terminated and the perforated strip is returned by the power driven return rollers 142 to the batch 21 of unplasticized material to be reincorporated therein and again returned to the forming dies. Retraction of the dies 92 clears the closure-receiving pockets 147 which then pass successively under the feeder chute 151. Each bolt head 88 operates the escapement mechanism permitting the bottom closure to drop by gravity into the associated pocket 147 as it passes beneath the end of the chute. Thereupon the die members move successively past the ejector wheel 131 which is positioned at such an angle that the beveled edge 137 wipes past the center waste disk 72. The latter is pierced by the ejector prong 138 and bodily removed by the wiper blade 139. Thereafter the transfer cam 85 engages the end of the transfer plunger 78, moving the transfer cylinder 75 bearing the gasket 71 on its end face 74 across the slot 64 and pressing the gasket into the closure member 73 in the opposite pocket 147 under sufficient pressure to cause it to adhere to the closure member. In order to assist this operation the closure members may, if desired, be heated to a higher temperature than the transfer cylinder 75 by any suitable means such for example, as a tube 175 positioned adjacent the feed chute 151 and through which heating fluid is passed. The die carrier 63 is itself provided with fluid channels 176, 177, see Fig. 10 through which temperature controlling fluid can be passed for the purpose of regulating the relative temperatures of the cooperating die members.

After transferring the gaskets and adhering them to the closure members, the cam 83 retracts the successive transfer cylinders 75, freeing the closure members so that they can drop out of the pockets 147 by gravity from the lower face of the die carrier.

If the gasket material is such as to require a curing or heating, it is then subjected to the necessary operation in place in the closures. As diagrammatically illustrated in Fig. 4, for example, the lined closures can drop from the carrier 63 onto a belt 181 passing around a roller 182 and arranged to carry the closures and gaskets through a suitable heating zone such, for example, as a curing oven 183.

In the operation of the present machine, it will be apparent that the die carrier 63 can be rotated at a relatively high speed to produce lined closure members at a high rate of production without, however, requiring the cutting speed of the gasket cutting dies being raised above a practical and efficient rate. Inasmuch as the speed of operation of the cutting dies can be fixed at any predetermined rate by suitably forming the slope of the die projecting cam 96, it will be apparent that the cutting speed of the dies can, therefore, be fixed independently of the speed of rotation of the die carrier 63 and the rate of production of the machine. The relative movement of the cooperating dies is entirely on rectilinear lines, although the dies themselves rotate continuously through a closed circuit in order to obtain the advantageous high production of a continuous operation.

Also, by rotating the die carrier 63 in a vertical plane and feeding the strip 30 of gasket material vertically upward along one side of the carrier, it is possible to feed the unlined closure members into the carrier at the top, and expel the lined closures at the bottom by gravity.

The invention can be variously modified and adapted and portions of the improvements can be used without others.

I claim:

1. A machine for continuously applying gasket rings to container caps comprising a plurality of pairs of cooperating gasket-forming dies; rotatably mounted means for supporting said dies and advancing the same continuously; means for guiding a continuous strip of gasket material for movement into the path of said dies and between the cooperating dies of each pair as they advance to advance therewith; means controlled by the movement of the supporting means for successively closing said pairs of dies on said strip to form a gasket in one of each pair of dies from the material of said strip as the dies advance; means for successively opening said pairs of dies to free the strip therefrom; means for feeding a continuous succession of caps to insert one at a time between said pairs of opened dies in alignment with the gasket in one of each pair as they pass a given point; means controlled by the movement of the supporting means for transferring the gasket in each of said dies to the cap aligned with it while the supporting means continues to advance and pressing the gasket into adhering contact with the cap; and means whereby the gasket-carrying caps are ejected one by one as they pass a delivery station.

2. A machine for continuously applying gasket rings to container caps comprising a plurality of pairs of cooperating dies, one of each pair having a cavity for receiving and forming an annular gasket; rotatably mounted means for supporting said dies and advancing the same continuously; means for guiding a continuous strip of gasket material for movement into the path of said dies and between the cooperating dies of each pair as they advance to advance therewith; a cam in the path of the movement of the dies for successively closing said pairs of dies on said strip to form a gasket in each die having a cavity from the material of said strip as the dies advance; a cam in the path of said dies for successively opening said pairs of dies to free the strip therefrom; means for feeding a continuous succession of caps to place one at a time between said pairs of opened die members in alignment with the gasket in one of each pair as they pass a given point; another cam in the path of said dies; means on each gasket-carrying die operated by said last-named cam for transferring the gasket to the cap aligned with it while the supporting means continues to advance and pressing the gasket into adhering contact with the cap; and means whereby the gasket-carrying caps are ejected one by one as they pass a delivery station.

3. A machine for continuously applying gasket rings to container caps comprising a plurality of pairs of cooperating dies, one of each pair having a cavity for receiving and forming an annular gasket and a cavity for receiving and holding a disk-like portion cut from the material within the annulus; rotatably mounted means for supporting said dies and advancing the same continuously; means for guiding a strip of gasket material for movement into the path of said dies and between the cooperating dies of each pair as they advance to advance therewith; means controlled by the movement of the supporting means for successively closing said pairs of dies on said strip to form a gasket including a disk-like portion in each die; means for successively opening said pairs of die members to free the strip therefrom; means for removing said disk-like portions from the dies; means for feeding a continuous succession of caps to insert one at a time between said pairs of opened dies in alignment with the gasket in one of each pair as they pass a given point; means controlled by the movement of the supporting means for transferring the gasket in each of said dies to the cap aligned with it while the supporting means continues to advance and pressing the gasket into adhering contact with the cap; and means whereby the gasket-carrying caps are ejected one by one as they pass a delivery station.

4. A machine comprising a plasticizing mill, mechanism for continuously guiding a strip of gasket material from said mill through a closed path and returning said strip to said mill; a plurality of relatively movable cooperating die members; means for continuously moving said members in succession through a closed circuit coinciding in part with a predetermined portion of the closed path of said strip so that during said part of its movement the strip is located between and moves with said cooperating die members; means for causing said members to move relatively to each other transversely to the direction of their movement along said circuit to cut an annular ring-shaped gasket from said strip; means for positioning closure members between each pair of cooperating die members for movement therewith along a different section of said circuit separated from the closed path of said strip; and means for causing said die members to move relatively to each other and deposit said gaskets in said closure members during movement thereof through said separate circuit section.

5. A machine comprising a plasticizing mill, mechanism for continuously guiding a strip of gasket material from said mill through a closed path and returning said strip to said mill; a plurality of relatively movable cooperating die members; means for continuously moving said members in succession through a closed circuit coinciding in part with a predetermined portion of the closed path of said strip so that during said part of its movement the strip is located between and moves with said cooperating die members; means for causing said members to move relatively to each other transversely to the direction of their movement along said circuit to cut a gasket ring and center disk from said strip; means for positioning closure members between each pair of cooperating die members for movement therewith along a different section of said circuit separated from the closed path of said strip; means for removing the center disks from within said gasket ring; and means for causing said die members to move relatively to each other and deposit said gasket ring in said closure members during movement thereof through said separate circuit section.

6. A machine for applying annular gaskets to container closures comprising a series of cooperating relatively movable die members; means for continuously moving said die members in a closed circuit past successive operating stations; means for guiding a continuous strip of gasket material between said cooperating die members for movement therewith past a first operating station; means at said first operating station for causing successive pairs of die members to move relatively toward each other to form a circular blank and simultaneously cut an annular gasket from said blank and deposit the gasket in one of said die members during movement thereof past said station; means for separating said relatively movable die members as they leave said first operating station and move away from said strip and before they reach a second operating station; means for inserting a container closure between said die members at said second operating station; and means for depositing the formed gasket on the facing surface of the closure member with sufficient pressure to insure adhesion.

7. A machine for applying annular gaskets to container closures comprising a series of cooperating relatively movable die members; means for continuously moving said die members in a closed circuit past successive operating stations; means for guiding a continuous strip of gasket material between said cooperating die members for movement therewith past a first operating station; means at said first operating station for causing successive pairs of die members to move relatively toward each other to form a circular blank and simultaneously cut an annular gasket surrounding a central disk from said blank and deposit the gasket in one of said die members during movement thereof past said station; means for separating said relatively movable die members as they leave said first operating station and move away from said strip and before they reach a second operating station; means for inserting a container closure between said die members at said second operating station; means for removing the central disk from the die member; and means for depositing the annular gasket on the facing surface of the closure member with sufficient pressure to insure adhesion.

8. A machine for applying annular gaskets to container closures comprising a series of cooperating relatively movable die members; means for continuously moving said die members in a closed circuit past successive operating stations; means for guiding a continuous strip of gasket material between said cooperating die members for movement therewith past a first operating station; means at said first operating station for causing successive pairs of die members to move relatively toward each other to form a circular blank and simultaneously cut an annular gasket surrounding a central disk from said blank and deposit the gasket in one of said die members during movement thereof past said station; means for separating said relatively movable die members as they leave said first operating station and move away from said strip and before they reach a second operating station; means for inserting a container closure between said die members at said second operating station; means including a rotary ejector having a pointed prong for penetrating and removing the central disk of material from the center of the die member; and means for depositing the formed gasket on the surface of the closure member with sufficient pressure to insure adhesion.

9. A machine for applying annular gaskets to container closures comprising a series of cooperating relatively movable die members; means for continuously moving said die members in a closed path past successive operating stations; means for guiding a continuous strip of gasket material between said cooperating die members for movement therewith past a first operating station; means at said first operating station for causing successive pairs of die members to move relatively toward each other to blank an annular gasket from said strip and deposit the gasket in one of said die members during movement thereof past said station; means for separating said relatively movable die members as they leave said first operating station and move away from said strip, and before they reach a second operating station; means for inserting a container closure between said die members at said second operating station; and means for depositing the annular gasket on the facing surface of the closure member with sufficient pressure to insure adhesion.

10. A machine for applying annular gaskets to container closures comprising a series of cooperating relatively movable die members; means for continuously moving said die members in a closed path past successive operating stations; means for guiding a continuous strip of gasket material between said cooperating die members for movement therewith past a first operating station; means at said first operating station for causing successive pairs of die members to move relatively toward each other to blank an annular gasket from said strip and deposit the gasket in one of said die members during movement thereof past said station; means for separating said relatively movable die members as they leave said first operating station and move away from said strip, and before they reach a second operating station; means for inserting a container closure between said die members at said second operating station; and means forming a part of the gasket-holding die member for depositing the annular gasket on the surface of the closure member with sufficient pressure to insure adhesion.

11. A machine for applying annular gaskets to container closures comprising a series of cooperating relatively movable die members; means for continuously moving said die members in a closed circuit past successive operating stations; a source of gasket material; means for guiding a continuous strip of gasket material from said source between said cooperating die members for movement therewith past a first operating station; means at said first operating station for causing successive pairs of die members to move relatively toward each other to blank an annular gasket from said strip and deposit the gasket in one of said die members during movement thereof past said station; means for separating said relatively movable die members as they leave said first operating station and move away from said strip, and before they reach a second operating station; means for inserting a container closure between said die members at said second operating station; means for pressing the formed gasket on the facing surface of the closure member with sufficient pressure to insure adhesion; and means for returning the remainder of the strip to said source.

12. A machine comprising in combination a plurality of pairs of cooperating relatively movable die members; a carrier for moving said pairs of die members successively through a curved path; means for guiding a relatively wide strip of moldable material edgewise between said cooperating die members for movement therewith along at least a part of said curved path in the plane of the strip whereby the side edges of the strip form radially curved inner and outer edges of different radii of curvature; means located between each successive pair of cooperating die members including strip guiding portions located adjacent an inner curved edge of the strip and out of the cutting plane of said pairs of die members for taking up the slack in the area adjacent the inner edge of the curved strip to compensate for the differing radii of curvature between the radially inner and outer edges of said strip to prevent wrinkling of said strip between said die members during movement around said curved path; and means for causing successive pairs of said die members to move relatively to each other to successively cut gaskets of predetermined shape from said strip during its movement along said curved path.

13. A machine comprising in combination a plurality of pairs of cooperating relatively movable die members; a carrier for moving said pairs of die members successively through a curved path; means for guiding a relatively wide strip of moldable material edgewise between said cooperating die members for movement therewith along at least a part of said curved path in the plane of the strip whereby the side edges of the strip form radially curved inner and outer edges of different radii of curvature; strip-supporting means extending generally radially to said curved path located between each successive pair of cooperating die members and inclined to the normal cutting plane of said die members for taking up the slack in the area adjacent the inner edge of the curved strip to compensate for the differing radii of curvature between the radially inner and outer edges of said strip to prevent wrinkling of said strip between said die members during movement around said curved path; and means for causing successive pairs of said die members to move relatively to each other to successively cut gaskets of predetermined shape from said strip during its movement along said curved path.

14. A machine for applying annular ring-shaped gaskets to container closures comprising a series of cooperating relatively movable die members; a rotary carrier for continuously moving said die members through a closed circuit lying substantially in a vertical plane; means for guiding a continuous strip of gasket material in an upward direction between said cooperating die members for movement therewith past a first operating station; means for bringing each of said pairs of die members together on said strip during movement thereof to form a circular blank from said strip and simultaneously cut an annular gasket from the edge of said blank and deposit the gasket in one of each of said pairs of die members, separating each pair of die members as it moves upwardly away from said first operating station and said strip of material, and before it reaches a second operating station; means for feeding a closure member by gravity between each pair of die members during movement thereof past said second operating station; means for bringing the formed gasket and the facing surface of the closure member together with sufficient pressure to insure adhesion during downward movement on said carrier; and means for releasing the composite closure and gasket for ejection by gravity from the lower part of said carrier.

15. A machine for cutting annular gaskets and applying the same to closure members comprising relatively movable cooperating die members, one of said members including a cutter cylinder, spaced inner and outer concentric circular cutters on the end of said cutter cylinder; means to guide a strip of gasket-forming material into a position between said cooperating die members; means for urging said die members together to impale said strip and press an annular gasket cut out of said strip into the annular space between said concentric circular cutters; means to separate said die members and remove therefrom the strip; means to position a closure member in alignment with said cutters; and means to remove said annular gasket from within said annular space between the concentric circular cutters and deposit the same within said closure member.

16. A machine for cutting annular gaskets comprising relatively movable cooperating die members, one of said members including a cutter cylinder, spaced inner and outer concentric circular cutters on the end of said cutter cylinder; means to guide a strip of gasket-forming material into a position between said cooperating die members; means for urging said die members together to impale said strip and press an annular gasket cut out of said strip into the annular space between said concentric circular cutters; means to separate said die members and remove therefrom the strip; means to position a closure member in alignment with said cutters; a transfer cylinder telescoped and slidable within the annular space between the concentric circular cutters; and means for moving said transfer cylinder through said annular space to remove said annular gasket therefrom and deposit the same within said closure member.

HENRY Z. GORA.

References Cited in the file of this patent

UNITED STATES PATENTS

| Number | Name | Date |
|---|---|---|
| 1,364,183 | Dietrich | Jan. 4, 1921 |
| 1,492,510 | De Escobales | Apr. 29, 1924 |
| 1,624,849 | Steele et al. | Apr. 12, 1927 |
| 1,669,623 | Messer | May 15, 1928 |
| 1,706,874 | De Journo | Mar. 26, 1929 |
| 1,731,537 | Krause | Oct. 15, 1929 |
| 1,750,708 | Edwards | Mar. 18, 1930 |
| 1,856,319 | Cooper | May 3, 1932 |
| 1,858,225 | Frederick | May 10, 1932 |
| 1,958,137 | Fowler | May 8, 1934 |
| 1,970,396 | Scherer | Aug. 14, 1934 |
| 1,996,048 | Madina | Mar. 26, 1935 |
| 2,103,860 | Mazzeo | Dec. 28, 1937 |
| 2,230,189 | Ferngren | Jan. 28, 1941 |
| 2,251,135 | Iknayan et al. | July 29, 1941 |
| 2,278,643 | Braun | Apr. 7, 1942 |
| 2,275,525 | Halmrast | Mar. 10, 1942 |
| 2,275,561 | Sahlin | Mar. 10, 1942 |
| 2,540,195 | Engler | Feb. 6, 1951 |
| 2,548,304 | Gora | Apr. 10, 1951 |